US006671389B1

(12) United States Patent
Marzke et al.

(10) Patent No.: US 6,671,389 B1
(45) Date of Patent: Dec. 30, 2003

(54) METHOD AND SYSTEM FOR DETECTING DIGITAL CAMERA FAILURE

(75) Inventors: Rex E. Marzke, Houston, TX (US); Jeffrey J. Hawkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/561,259

(22) Filed: Apr. 27, 2000

(51) Int. Cl.[7] .................................................. G06K 9/00
(52) U.S. Cl. ...................................... 382/101; 382/235
(58) Field of Search ................................ 382/112, 275, 382/235, 305, 101; 358/909.1; 348/143; 714/48; 702/59, 143

(56) References Cited

U.S. PATENT DOCUMENTS

| | | | |
|---|---|---|---|
| 4,271,519 A | 6/1981 | Hall | 371/38 |
| 5,237,161 A | 8/1993 | Grodevant | 235/462 |
| 5,249,053 A * | 9/1993 | Jain | 348/207.99 |
| 5,369,258 A * | 11/1994 | Sansone et al. | 235/381 |
| 5,526,198 A | 6/1996 | Dodt et al. | 360/48 |
| 5,666,157 A | 9/1997 | Aviv | 348/152 |
| 5,825,924 A * | 10/1998 | Kobayashi | 382/219 |
| 5,880,775 A | 3/1999 | Ross | 348/143 |
| 5,907,619 A | 5/1999 | Davis | 380/23 |
| 5,956,424 A * | 9/1999 | Wootton et al. | 382/192 |
| 2003/0117514 A1 * | 6/2003 | Weintroub et al. | 348/345 |

FOREIGN PATENT DOCUMENTS

EP     0661677 A2 *   7/1995   ............. G07F/7/10

OTHER PUBLICATIONS

Baxes, Gregory A. "Digital Image Processing: Principles and Applications". 1994, John Wiley & Sons, Inc. pp. 73–75 and 214–215.*
IBM Technical Disclosure Bulletin v27 n10b 3–85 p6173–6181 *Signal Validity Detection.*

* cited by examiner

*Primary Examiner*—Brian Werner
*Assistant Examiner*—Ryan J. Miller
(74) *Attorney, Agent, or Firm*—Karl O. Hesse; Norman L. Gundel

(57) ABSTRACT

A system for detecting a digital camera failure captures an image with the digital camera. The system compresses the image into a compressed image file and compares the size of the compressed image file with a predetermined file size. A digital camera failure is indicated if the size of the compressed image file is greater than a predetermined upper limit file size or less than a predetermined lower file size limit. The system may also compare the number of pixels of a predetermined color with the total number of pixels of the captured image. A digital camera failure is indicated if the number of pixels of the predetermined color is greater than a predetermined percentage of the total number of pixels of the captured image.

7 Claims, 3 Drawing Sheets

METHOD AND SYSTEM FOR DETECTING DIGITAL CAMERA FAILURE

FIELD OF THE INVENTION

The present invention relates general to the field of digital image capture, more particularly to a method of and system for detecting the failure to capture a usable image by a digital camera. The method and system of the present invention find application security systems that capture a digital image. The present invention is particularly adapted for use in an automated postal kiosk environment.

DESCRIPTION OF THE PRIOR ART

Many systems use cameras for security purposes. Such systems include a relatively inexpensive digital cameras that capture images either at regular intervals or upon the occurrence of an event. The captured images may be stored for later review by a human.

The digital cameras used in security systems may fail to capture an image that is acceptable for identification. For example, the there may be a system failure due to hardware, mechanical, or communication problems. The camera may also fail to capture an acceptable image on account of there being inadequate lighting. Additionally, the subject may defeat the camera by placing an object, such as his hand, over the camera lens. Currently, there is no mechanism for detecting such camera failures.

An example of such a system is an unattended automated postal kiosk, which includes a digital camera. The postal kiosk includes user interface, such as a touch screen display, by which a customer can select a postal transaction type, e.g. Express Mail, Priority Mail, etc., a scale, by which the system may determine the proper amount of postage for the transaction, a payment acceptor, and a postage dispenser. Federal Aviation Administration (FAA) regulations require that the United States Postal Service obtain positive identification from any person that mails a Priority Mail package weighing more than one pound. A standalone kiosk can comply with FAA regulations, and process Priority Mail requests, because it can take a picture of every customer that attempts to mail such a package, and associate the picture with the package. However, currently, the pictures taken at the kiosk are not reviewed by a human unless the FAA requests the picture associated with a particular Priority Mail piece mailed from the kiosk. If there is a failure of the digital camera, then there is a failure of security.

SUMMARY OF THE INVENTION

The present invention provides a method of and system for detecting a digital camera failure. The system of the present invention captures an image with the digital camera. The system compresses the image into a compressed image file and compares the size of the compressed image file with a predetermined file size. A small file size implies that there is insufficient color differentiation in the image to make the image usable. A large file size implies that there is extraneous random noise in the image. Thus, according to the present invention, a digital camera failure is indicated if the size of the compressed image file is greater than a predetermined upper limit file size or less than a predetermined lower file size limit. The upper and lower limits are determined empirically. Additionally, the predominance of one particular color in the image implies that the subject has place an object, such as his hand, over the lens of the camera. Accordingly, the system may also compare the number of pixels of a predetermined color with the total number of pixels of the captured image. A digital camera failure is indicated if the number of pixels of the predetermined color is greater than a predetermined percentage of the total number of pixels of the captured image.

DESCRIPTION OF THE PREFERRED EMBODIMENT

Figure 1:
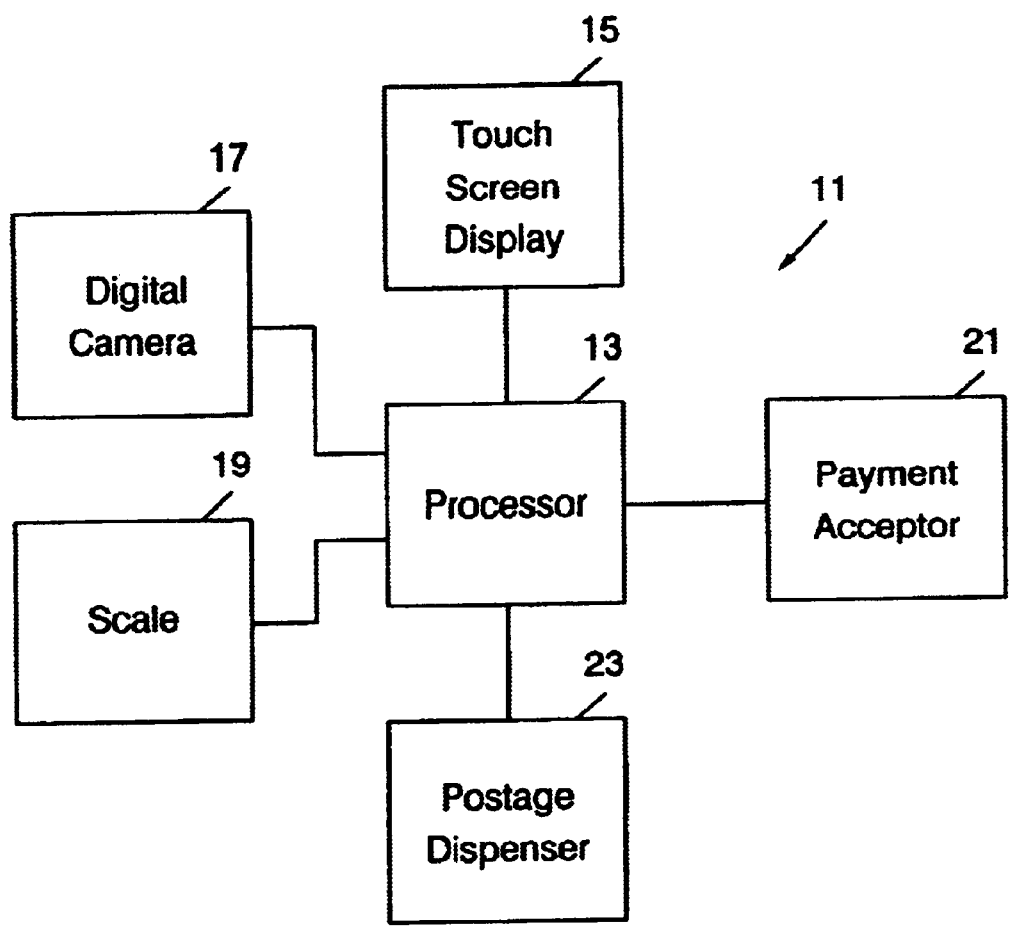
FIG. 1 is a block diagram of a system according to the present invention.

Referring now to the drawings, and first to FIG. 1, a block diagram of an unattended, postal kiosk system according to present invention is designated generally by the numeral 11. The postal kiosk of the present invention is adapted for self-service use by customers. The postal kiosk is preferably housed as a unit in a suitable case.

The system of the present invention includes a central processing unit (CPU) or processor 13 that is programmed according to present invention to process postal transactions. A touch screen display 15 provides a user interface by which a customer can initiate transactions and respond to prompts from processor 13. Touch screen display 15 is adapted to present information messages and selection choices to the customer. As will be recognized by those skilled in the art, alternative user interface devices, such as a display and keyboard or keypad, or a display and pointing device, may be provided.

System 11 includes a digital camera 17 operably connected to processor 13. As is well known, digital camera 17 includes an optical lens system and an electro- optical system for capturing digital images. Digital camera 17 is positioned to capture an image of a customer using touch screen display 15. Preferably, digital camera 17 is positioned in the housing of the kiosk behind a transparent glass or plastic protective barrier.

System 11 includes a scale 19 adapted for weighing an item to be mailed. Scale 19 provides a digital weight output to processor 13. Processor 13 is programmed to calculate the postage required to mail an article of a particular weight according to a selected class and to display weight and postage rate information on touch screen display 15. As will be explained in detail hereinafter, processor 13 is also programmed to actuate digital camera 17 to capture an image and perform security processing according to the present invention if the user has selected Priority Mail and the item to be mailed weighs more than one pound.

System 11 also includes a payment acceptor 21 and a postage dispenser 23, each operably connected to processor 13. Payment acceptor 21 preferably includes a currency/coin acceptor and a change machine, for enabling a customer to make cash transactions, and a card reader, for enabling a customer to make credit, debit, and ATM card transactions. Suitable communications hardware and interfaces are provided for card transactions. Postage dispenser 23 includes a stamp machine, for dispensing standard denomination postage stamps, as well as a printer device for printing special postage stickers and identifying indicia for trackable items, such as Priority Mail packages.

Figure 2:
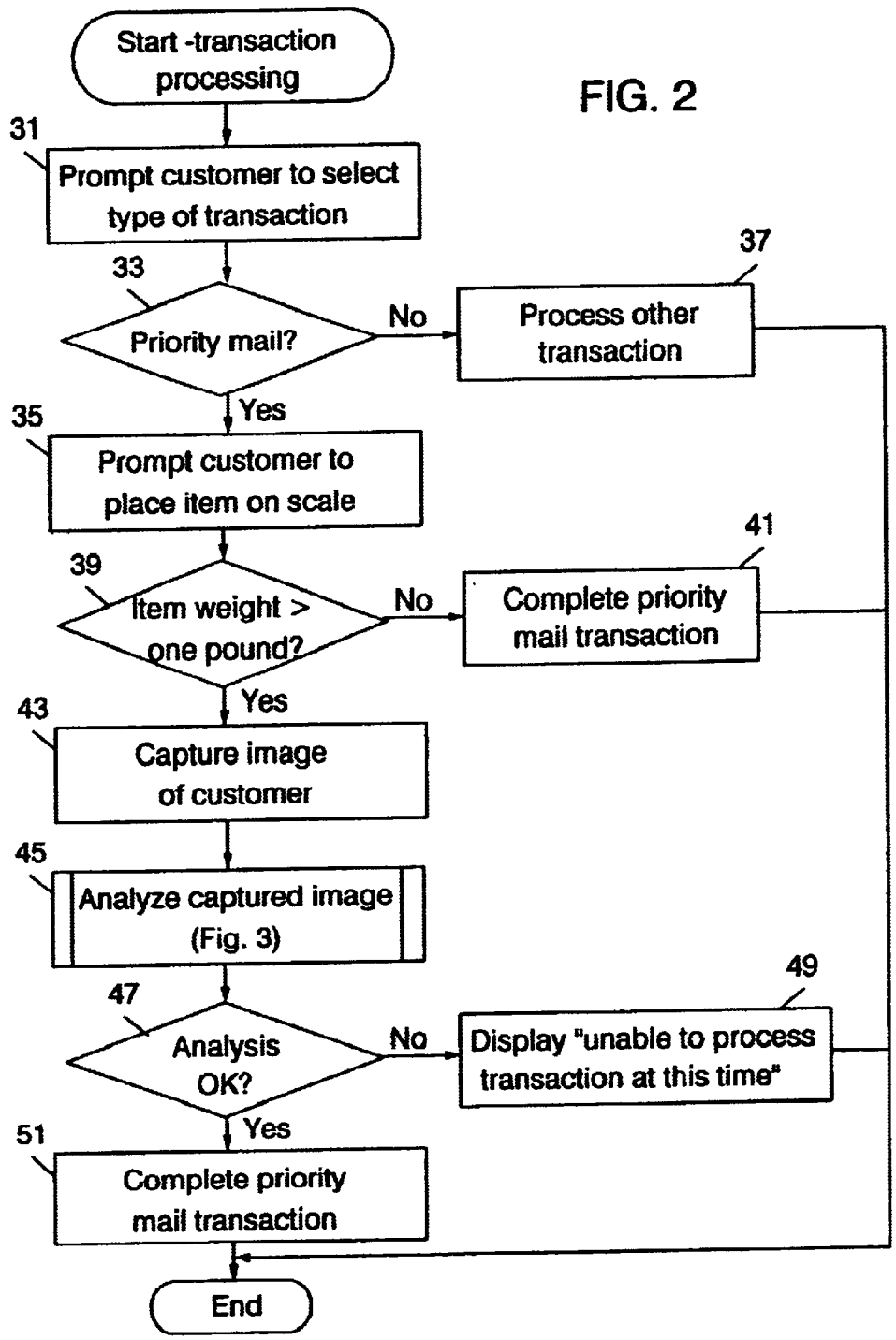
FIG. 2 is a flowchart of processing according to the present invention.

Referring now to FIG. 2, there is shown a high level flowchart of transaction processing according to the present invention. At the start of a transaction, the system prompts the customer to select a transaction type, at block 31, and waits for input. Preferably, the system displays selection items such as First Class Mail, Priority Mail, Express Mail, etc., on touch screen display 15. If, as determined at decision block 33, the customer selects Priority Mail, the system prompts the customer to place the item to be mailed on the scale, at block 35. If the customer selects a transaction type other than Priority Mail, the system performs other processing, as indicated generally at block 37, and processing ends.

Referring again to block 35, after the customer has placed the item on the scale, the system tests, at decision block 39, if the item weighs more than one pound. FAA regulations require positive identification of person who uses Priority Mail to mail an item weighing more than one pound. If the item weighs less than one pound, the system performs Priority Mail processing, as indicated generally at block 41, and processing ends. If the Priority Mail item weighs more than one pound, then the system actuates digital camera 17 to capture an image, at block 43. The system then analyzes the captured image, as indicated generally at block 45. As will explained in detail with respect to FIG. 3, image analysis according to the present invention, determines if the digital camera has failed to capture a usable image. After image analysis, the system tests, at decision block 47, if the analysis is OK. If not, the system displays a message reading "Unable to process transaction at this time" or words to that effect, at block 49, and processing ends. The system may report the camera failure to a servicing entity so that the failure may be investigated and corrective action taken. If the image analysis is OK, then the system completes the Priority Mail transaction, at block 51.

Figure 3:
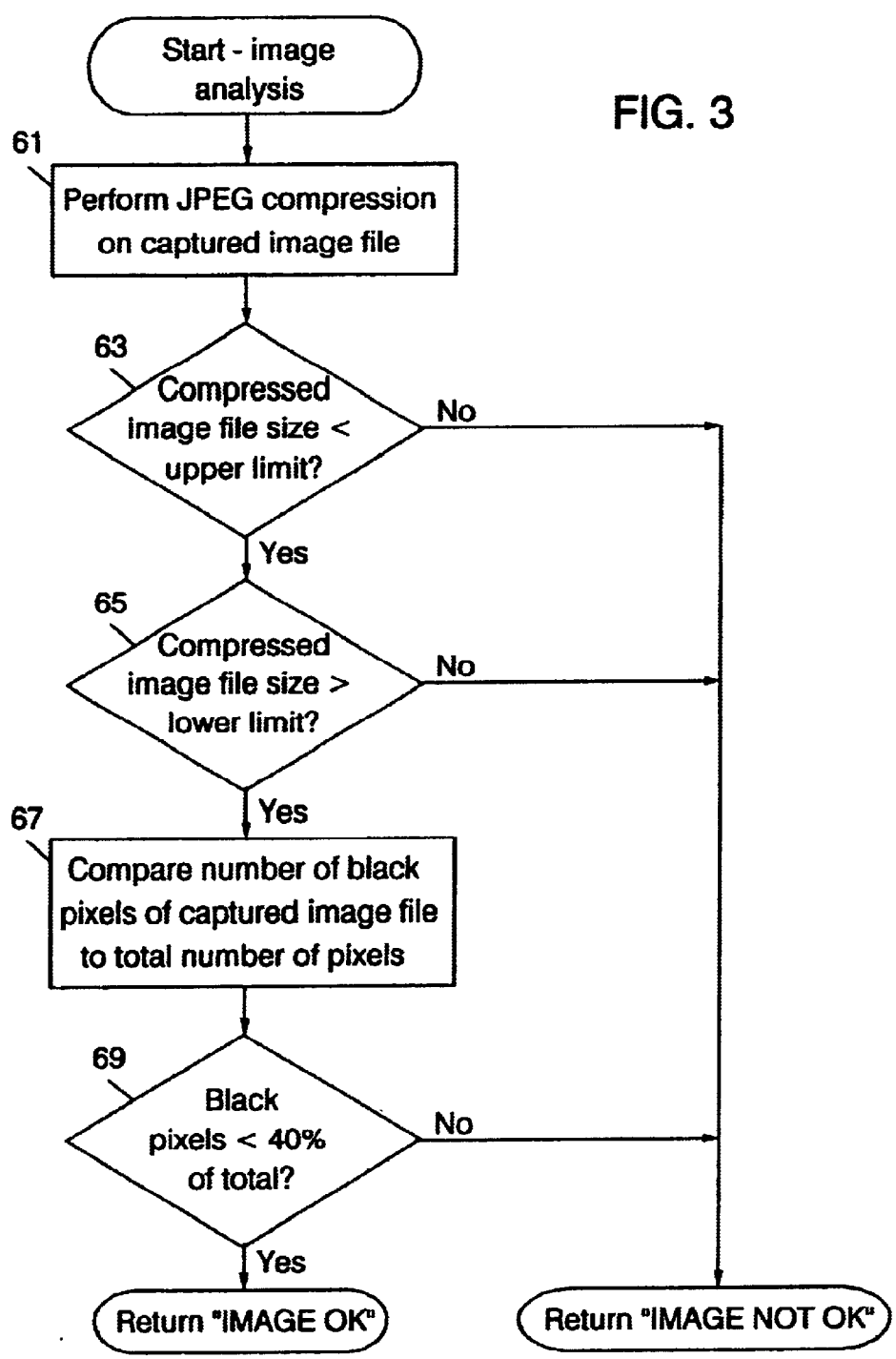
FIG. 3 is a flowchart of captured image analysis according to the present invention.

Referring now to FIG. 3, there is shown a high level flowchart of the image analysis of block 45 of FIG. 2. The system first performs compression of the captured image file, preferably according t,o the Joint Photographic Experts Group (JPEG) standard, at block 61. The JPEG standard is well known to those skilled in the art. Generally, the algorithm uses the discrete cosine transform (GCT) technique to encode 8×8 blocks of pixels at a time. The coefficients resulting from the GCT are quantized according to a quantization table. Then, a process known as zig-zag ordering arranges the DCT coefficients serially so that zero-value coefficients tend to be together at the end of each block. Finally, the system performs statistical coding, such as Huffman coding, to produce a compressed image file.

According to the present invention, the quality of the image can be inferred from the size, in bytes, of the compressed image file. A small file size implies that there is insufficient color differentiation in the image to make the image usable. A large file size implies that there is excessive extraneous random noise in the image. Thus, the system tests, at decision block 63, if the compressed image file size is less than an empirically determined upper limit. If not, image analysis returns "IMAGE NOT OK" to FIG. 2. If the compressed image file size is less than the predetermined upper limit, the system tests, at decision block 65, if the compressed image file size is greater than an empirically determined lower limit. Again, if not, the system returns "IMAGE NOT OK."

Preferable, after determining at decision blocks 65 and 67 that the compressed image file size is between the predetermined upper and lower limits, and if processing time permits, the system analyzes the color values of the captured, uncompressed, image. A predominant color of black or near black indicates that the subject placed an object, such as his hand, over the camera lens, and the image is assumed to be unusable. Thus, the system compares the number of black pixels of the captured image file to the total number of pixels, at block 67. If, as determined at decision block 69, the number of black pixels is less than 40% of the total, the system returns "IMAGE OK." If not, the system returns "IMAGE NOT OK."

From the foregoing, it may be seen that the present invention provides a quick and efficient method and system for detecting the failure of digital camera. The system of the present invention is implemented in software and thus requires no additional hardware. The computer processing time required to achieve the bulk of the invention's processing is minimal. The invention can detect a range of common digital camera failures.

The invention has been illustrated and described with respect to a presently preferred embodiment. Those skilled in the art, given the benefit of the foregoing disclosure, will recognize alternative embodiments. Certain features of the invention may be utilized or implemented independent of other features. Accordingly, the foregoing description is intended for purposes of illustration and not of limitation.

What is claimed is:

1. A method of detecting a digital camera failure, which comprises the steps of:

capturing an image with said digital camera;

compressing said image into a compressed image file having a file size:

comparing the size of said compressed image file with a predetermined file size; and indicating a failure of said digital camera if the size of said compressed image file is greater than a predetermined upper limit file size.

2. A method of detecting a digital camera failure, which comprises the steps of:

capturing an image with said digital camera;

compressing said image into a compressed image file having a file size;

comparing the size of said compressed image file with a predetermined file size; and indicating a failure of said digital camera if the size of said compressed image file is less than a predetermined lower limit file size.

3. A method of determining a digital camera failure, which comprises the steps of:

capturing an image with said digital camera;

compressing said image into a compressed image file having a file size;

comparing the size of said compressed image file with a predetermined file size;

comparing the number of pixels of a predetermined color with the total number of pixels of said captured image; and indicating a failure of said digital camera if the size of said compressed image file is greater than a predetermined upper limit file size.

4. A method of determining a digital camera failure, which comprises the steps of:

capturing an image with said digital camera;

compressing said image into a compressed image file having a file size;

comparing the size of said compressed image file with a predetermined file size; and indicating a failure of said digital camera if the size of said compressed image file is less than a predetermined lower limit file size.

5. A method of providing security to an automated postal kiosk, said automated postal kiosk including a digital camera, said method comprising the steps of:

initiating a postal transaction;

capturing an image with said digital camera;

compressing said image into a compressed image file having a file size;

comparing the size of said compressed image file with a predetermined file size; and terminating said postal transaction if said step of comparing determines that the size of said compressed image file is greater than a predetermined upper limit file size.

6. A method of providing security to an automated postal kiosk, said automated postal kiosk including a digital camera, said method comprising the steps of:

initiating a postal transaction;

capturing an image with said digital camera;

compressing said image into a compressed image file having a file size;

comparing the size of said compressed image file with a predetermined file size; and terminating said postal transaction if said step of comparing determines that the size of said compressed image file is less than a predetermined lower limit file size.

7. A automated postal kiosk, which comprises:

a digital camera for capturing an image; and, a processor connected to said digital camera for compressing said image into a compressed image file having a file size, and comparing the size of said compressed image file with a predetermined file size; and means connected to said processor for enabling completion of a postal transaction if said processor determines that the size of said compressed image file is greater than a predetermined lower limit file size and less than a predetermined upper limit file size otherwise terminating said transaction.

* * * * *